US012661535B2

(12) United States Patent
Quist

(10) Patent No.: US 12,661,535 B2
(45) Date of Patent: Jun. 23, 2026

(54) FACEMASK HAVING IMPROVED FIT AND CONSTRUCTION

(71) Applicant: Erik Quist, Knoxville, TN (US)

(72) Inventor: Erik Quist, Knoxville, TN (US)

( * ) Notice: Subject to any disclaimer, the term of this patent is extended or adjusted under 35 U.S.C. 154(b) by 918 days.

(21) Appl. No.: 17/660,014

(22) Filed: Apr. 20, 2022

(65) Prior Publication Data

US 2022/0401764 A1 Dec. 22, 2022

Related U.S. Application Data

(60) Provisional application No. 63/201,237, filed on Apr. 20, 2021.

(51) Int. Cl.

*A62B 23/02* (2006.01)
*A41D 13/11* (2006.01)
*A62B 9/04* (2006.01)
*A62B 9/06* (2006.01)

(52) U.S. Cl.

CPC ........ *A62B 23/025* (2013.01); *A41D 13/1107* (2013.01); *A62B 9/04* (2013.01); *A62B 9/06* (2013.01)

(58) Field of Classification Search

CPC ....... A62B 23/025; A62B 18/025; A62B 9/06; A62B 18/02; A62B 23/02; A41D 13/1107; A41D 13/113

See application file for complete search history.

(56) References Cited

U.S. PATENT DOCUMENTS 3,779,244 A * 12/1973 Weeks, Jr. ......... A41D 13/1146 55/DIG. 35
5,322,061 A * 6/1994 Brunson ............ A41D 13/1184 128/206.13
11,083,231 B1 * 8/2021 Lewis ................ A41D 13/1176
11,273,274 B1 * 3/2022 Schatz .............. A61M 15/0085
2015/0328421 A1 * 11/2015 Stephenson ....... A61M 16/0683 128/205.25
2017/0079359 A1 * 3/2017 Chase .................... A41D 23/00
2017/0281993 A1 * 10/2017 O ........................... B01D 53/82
2019/0174845 A1 * 6/2019 Cheng .................... A62B 18/02
2021/0315291 A1 * 10/2021 Votolato ................. A42B 1/018
2021/0329994 A1 * 10/2021 Sun ........................ A41D 31/02
2021/0329995 A1 * 10/2021 Dietz ................... A62B 18/025
2021/0401085 A1 * 12/2021 Liu .................... A41D 13/1161
2022/0110378 A1 * 4/2022 Tang .................... A62B 23/025
2022/0192288 A1 * 6/2022 Walcott ................ A61B 5/7282

* cited by examiner

*Primary Examiner* — Valerie L Woodward
(74) *Attorney, Agent, or Firm* — Robinson IP Law, PLLC

(57) ABSTRACT

A facemask includes: a mask portion shaped to substantially cover a nose and mouth of a wearer of the facemask, the mask portion formed of a flexible material; a nose bridge extending substantially across a width of an upper edge of the mask portion and including a stiff deformable portion located on the nose bridge, wherein the stiff deformable portion is deformable to contour to a shape of a face of the wearer while substantially retaining the shape during use of the facemask; a first ear loop located along a first side of the mask portion; and a second ear loop located along a second side of the mark portion.

12 Claims, 8 Drawing Sheets

FACEMASK HAVING IMPROVED FIT AND CONSTRUCTION

CROSS-REFERENCE TO RELATED APPLICATION

This application claims priority to and is a non-provisional of U.S. Patent Application Ser. No. 63/201,237 for "Fit and Construction of Facemasks" filed on Apr. 20, 2021, the contents of which are incorporated herein by reference in its entirety.

FIELD

Embodiments of this disclosure relate to face masks (or "facemasks") worn or affixed to the head of a person (a "user") for the purpose of covering their nose and mouth, made of differing materials, with some having the capability, by the use of material as a part of a layer of the facemask, to provide air filtration, and has methods in which the facemask is held in place on the user's face and head, as well as having capabilities for different purposes and uses of the facemask.

BACKGROUND

There are many types of facemasks currently on the market. Some are made of materials which enable the facemask to remain ridged and otherwise retain their original shape, in a cupped fashion, like one half of the outer shell of a sphere. These types of masks commonly provide some type of air filtration protection, by using specific materials in a layer of the facemask. Examples of this type are National Institute for Occupational Safety and Health (NIOSH) certified N95 facemasks. Some have an exhale valve on the front of the facemask, and some do not.

Other types are constructed of materials which allow the facemask to remain flexible and foldable and otherwise be manipulated. Some utilize materials which are resistant to moisture or liquids and have the capability, by using specific materials in a layer of the facemask, to provide air filtration protection. Examples of this type are Food and Drug Administration (FDA) approved Medical Procedure Facemasks or a simpler type such as disposable medical facemasks one sees in hospitals and dentist offices. Others of this type use specific materials in a layer of the facemask to provide some sort of filtration for many different purposes and intentions and others do not have a specific filtration layer. Many of this type have come on the market in response to the 2020 COVID-19 pandemic.

Nose Bridge Device

All of the ridged type of facemasks has, and most of the flexible type of facemasks also has, if anything is used at all, some sort of device that is a part of the facemask either affixed in some fashion or embedded in some way on the part of the facemask which fits over the bridge of the user's nose ("nose bridge device") that can be squeezed, pinched, or manipulated down by the user's fingers in order to create and then maintain the tension of that device to help ensure a closer fit of the facemask by decreasing or eliminating any space between the facemask material and the user's skin in the area around the nose.

The nose bridge device is usually about 8 cm long, 1 cm wide and flat, less than 0.2 mm deep, made of a thin piece of plastic with a thin wire embedded in the middle of the length of the 1 cm width or two thin wires embedded on each edge along the length of the 1 cm width of the piece of plastic. Other nose bridge devices such as ones affixed to the facemasks are strips of metal of essentially the same dimensions as the plastic piece or smaller. Based upon the materials utilized in the manufacture of the facemask, current nose bridge devices vary in their adequacy for their purpose of maintaining a secure fit of the facemask on the user's face and helping to prevent air flowing into or out of a gap usually present between the facemask and the user's skin in the area where the nose meets the face, sometimes referred to as the "corner of the nose".

Almost all nose bridge devices become less effective the longer the facemask is worn due to the weakening of any metal in that device. This weakening causes the user to constantly touch the mask, thus touching any contaminates on the mask, in the attempt to tighten the fit and close any gaps which may appear or reappear at the corner of the nose. Any gap at the corner of the nose can decrease the intended effectiveness of the facemask for its intended purpose in an expediential fashion. Embodiments herein provide for a unique and innovative type of nose bridge device which is much more effective.

Elastic Ear Strap

All facemasks employ some method by which the facemask fits onto the user's head and face and which helps the facemask stay in place to maximize its most effective means of use. Some facemask types utilize material which has elastic properties ("elastic material" or "elastic") in which the elastic material is either flat elastic material or is round such as an elastic cord ("elastic strap"). There is an elastic strap for each side of the facemask with one end of the elastic strap is attached to or embedded within the material at the top edge and the other end attached to or embedded within the material at the bottom edge. Then the elastic strap on each side is looped over and behind the user's ear on that side to hold the facemask onto the user's face with the elastic properties of the elastic straps creating tension and pulling the facemask tighter on the user's face to increase the secureness of the facemask's fit ("elastic ear straps" or "ear straps").

A common problem with elastic ear straps is that even when altered by shortening the length of the elastic strap in some manner to ensure enough tension for a secure fit, since the elastic ear strap is only attached at the top and bottom of each side, the facemask material at the middle of each side has the tendency to push away from the user's face which potentially creates an opening or gap between the user's skin and the facemask at that side resulting in the potential for air to pass into or out of the facemask bypassing any intended means of filtration regardless of whether that facemask had such capabilities. Embodiments herein solve this problem and provide a new and innovative type of elastic ear strap which significantly lessens the potential for an opening or gap at each side of the facemask and is more efficient and better maximizes the elastic properties of the straps.

Detection/Monitoring Technology

On the exterior of the facemasks currently on the market there does not appear to be any configuration, construction, or method in which the facemask's purpose and use is to accommodate any device, mechanism, or performance method to provide capabilities for detection and/or monitoring technology. Embodiments herein address this problem by providing a new and innovative way to enhance the capabilities of the facemask by adding a new purpose and use by configuring the facemask's exterior to provide capabilities for detection and/or monitoring capabilities related to such areas as radiation and UVC light.

What is needed, therefore, is a facemask having improved fit and construction that solves the above and other problems.

SUMMARY

Embodiments of face masks (or "facemasks") disclosed herein can be made of any type of material, can be rigid to retain its shape or flexible-foldable, utilized by a person ("user") to cover at a minimum the user's face and mouth, and which the facemask can be configured with or without a filtration method, and which the facemask utilizes some means to allow the user to wear the facemask, have it fit, in a way to maximize the intended benefits for that facemask.

Regarding one of the methods or configurations utilized on existing facemasks to maximize the intended benefits from that facemask's fit, is a device located in the portion of the face mask which fits over the bridge of the user's nose which is then pinched down over the nose to create a tighter fit ("nose bridge device"). Embodiments of facemasks described herein provide a unique, different, and innovative type of nose bridge device which is made of different material, shape, and dimensions which together significantly improves the effectiveness over any other previous nose bridge device on a facemask, creating a more secure and comfortable fit.

Regarding another of the methods or configurations on existing facemasks to maximize the intended benefits from that facemask's fit, are elastic straps or cords attached to the facemask, one strap on each side and attached at the top and bottom, which is used to loop over and behind each ear in a manner which uses the material's elastic properties and pulls the facemask towards the user's face and creates a tighter and more secure fit ("elastic ear straps" or "ear strap"). Embodiments of facemasks described herein include a different and innovative elastic ear strap which configures these elastic ear straps so that on each side a single strap is attached to itself forming a separate continuous loop and then embedded in a sleeve configured from the facemask's material at the side of the facemask in such a way that the ear strap will not vertically slip or move within the sleeve resulting in more force at the middle of the mask's side, which "gathers" that portion of the mask, significantly improving the results of any other previous elastic ear strap configuration on a facemask, creating a much more secure fit.

With regards to facemask methods or configurations utilized to maximize the intended benefits from that facemask's purpose and use, embodiments of this disclosure provide a new and innovative way to enhance the capabilities of the facemask by adding a new purpose and use by configuring the facemask's exterior to provide capabilities for detection and/or monitoring capabilities related to such areas as radiation and UVC light.

In a first aspect, a facemask includes: a mask portion shaped to substantially cover a nose and mouth of a wearer of the facemask, the mask portion formed of a flexible material; a nose bridge extending substantially across a width of an upper edge of the mask portion and including a stiff deformable portion located on the nose bridge, wherein the stiff deformable portion is deformable to contour to a shape of a face of the wearer while substantially retaining the shape during use of the facemask; a first ear loop located along a first side of the mask portion; and a second ear loop located along a second side of the mark portion.

The stiff deformable portion may be formed of a metal wire. The metal wire may be formed of armature wire.

The mask portion may further include a hem located along the upper edge of the mark portion, wherein the armature wire is located within the hem.

The first ear loop and the second ear loop may be elastic. The mask portion may further include a first channel located along the first side of the mark portion and a second channel along the second side of the mark portion. The first ear loop is located through the first channel along the first side of the mask portion and the second ear loop is located through the second channel along the second side of the mask portion.

The first channel and the second channel may be formed within side hems located along the first side and the second side of the mask portion. The first ear loop may slide within the first channel and wherein the second ear loop may slide within the second channel.

The stiff deformable portion of the nose bridge may retain the shaped contoured to the face of the wearer when the facemask is removed by the wearer. The facemask may further include a pocket located within the face mask portion shaped to receive a filter element therein. The facemask may further include a pocket located on an outer surface of the facemask portion and shaped to receive a detector element therein.

In a second aspect, a facemask includes: a mask portion shaped to substantially cover a nose and mouth of a wearer of the facemask, the mask portion formed of a flexible material; a nose bridge extending substantially across a width of an upper edge of the mask portion and including a stiff deformable portion comprising armature wire located on the nose bridge, wherein the armature wire is deformable to contour to a shape of a face of the wearer while substantially retaining the shape during use of the facemask; a first ear loop located along a first side of the mask portion; and a second ear loop located along a second side of the mark portion.

In a third aspect, a facemask may include: a mask portion shaped to substantially cover a nose and mouth of a wearer of the facemask, the mask portion formed of a flexible material; a nose bridge extending substantially across a width of an upper edge of the mask portion and including a stiff deformable portion located on the nose bridge, wherein the stiff deformable portion is deformable to contour to a shape of a face of the wearer while substantially retaining the shape during use of the facemask; a first channel located along a first side of the mask portion; a second channel located along a second side of the mask portion; a first ear loop located through the first channel along the first side of the mask portion; and a second ear loop located through the second channel along the second side of the mark portion. The stiff deformable portion may be secured on the nose bridge between the first channel along the first side of the mask portion and the second channel along the second side of the mask portion.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
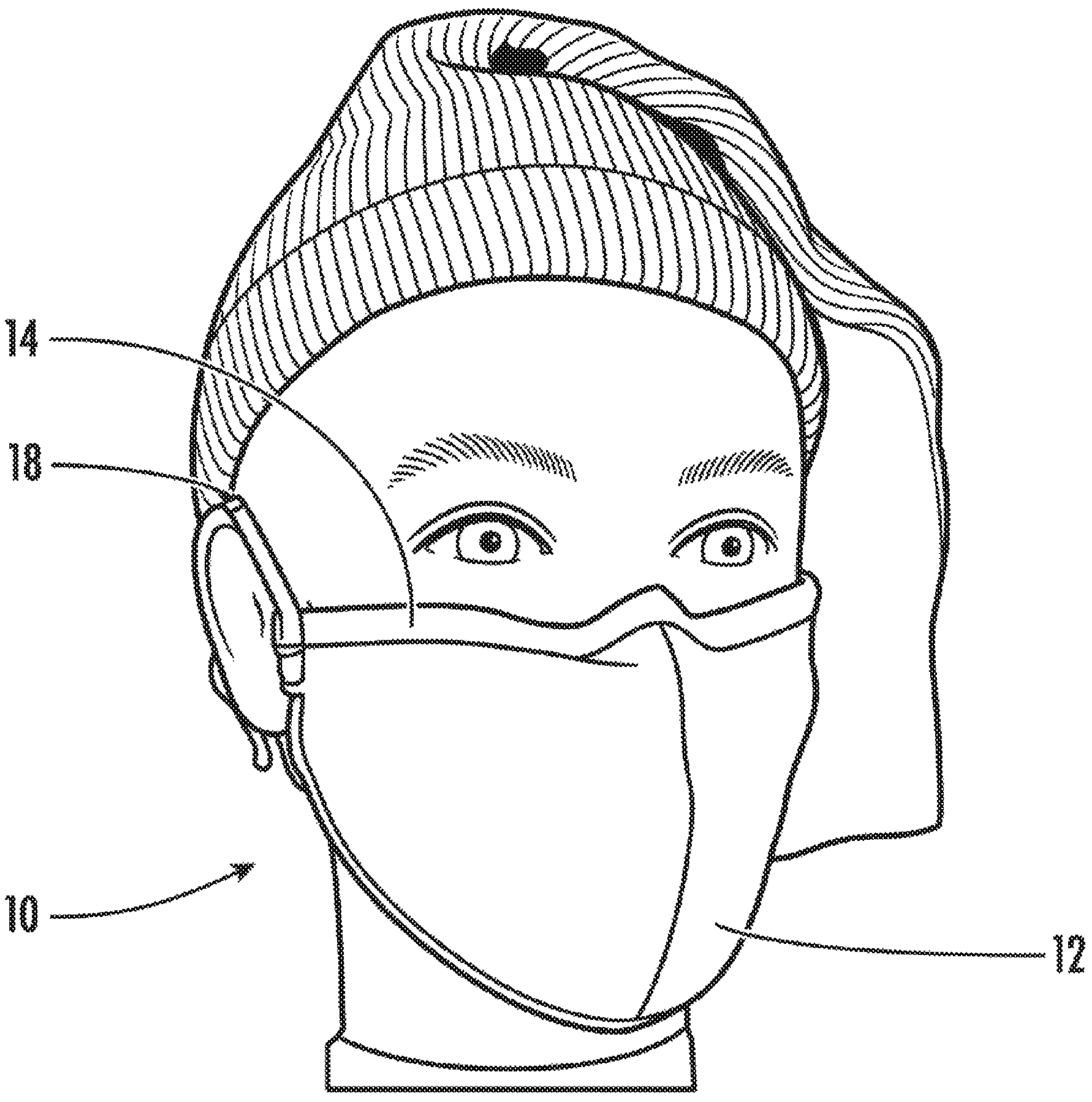
FIG. 1 shows a perspective front view of a facemask according to one embodiment of the present disclosure.
Figure 2:
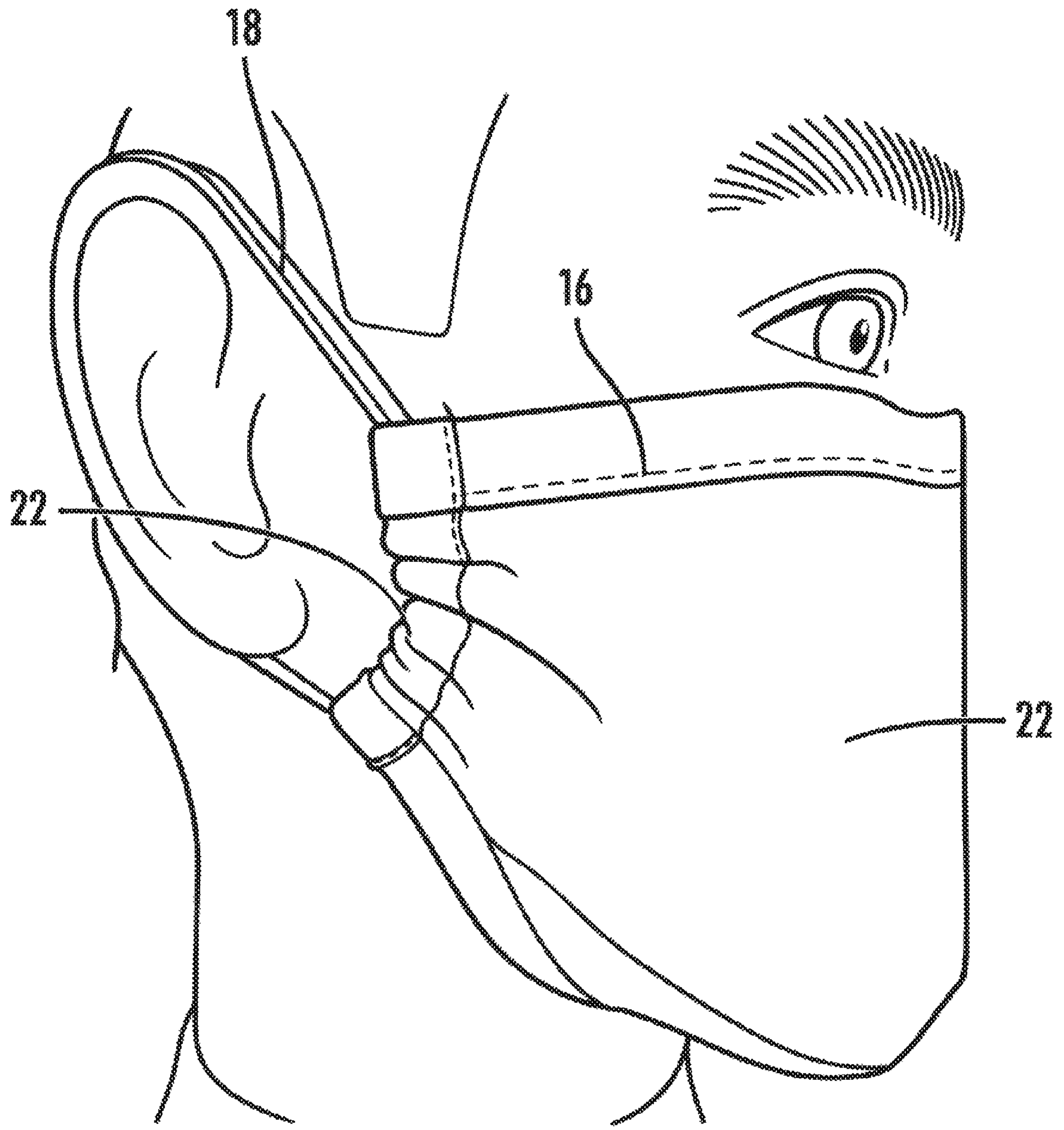
FIG. 2 shows a close-up side view of a facemask according to one embodiment of the present disclosure.
Figure 3:
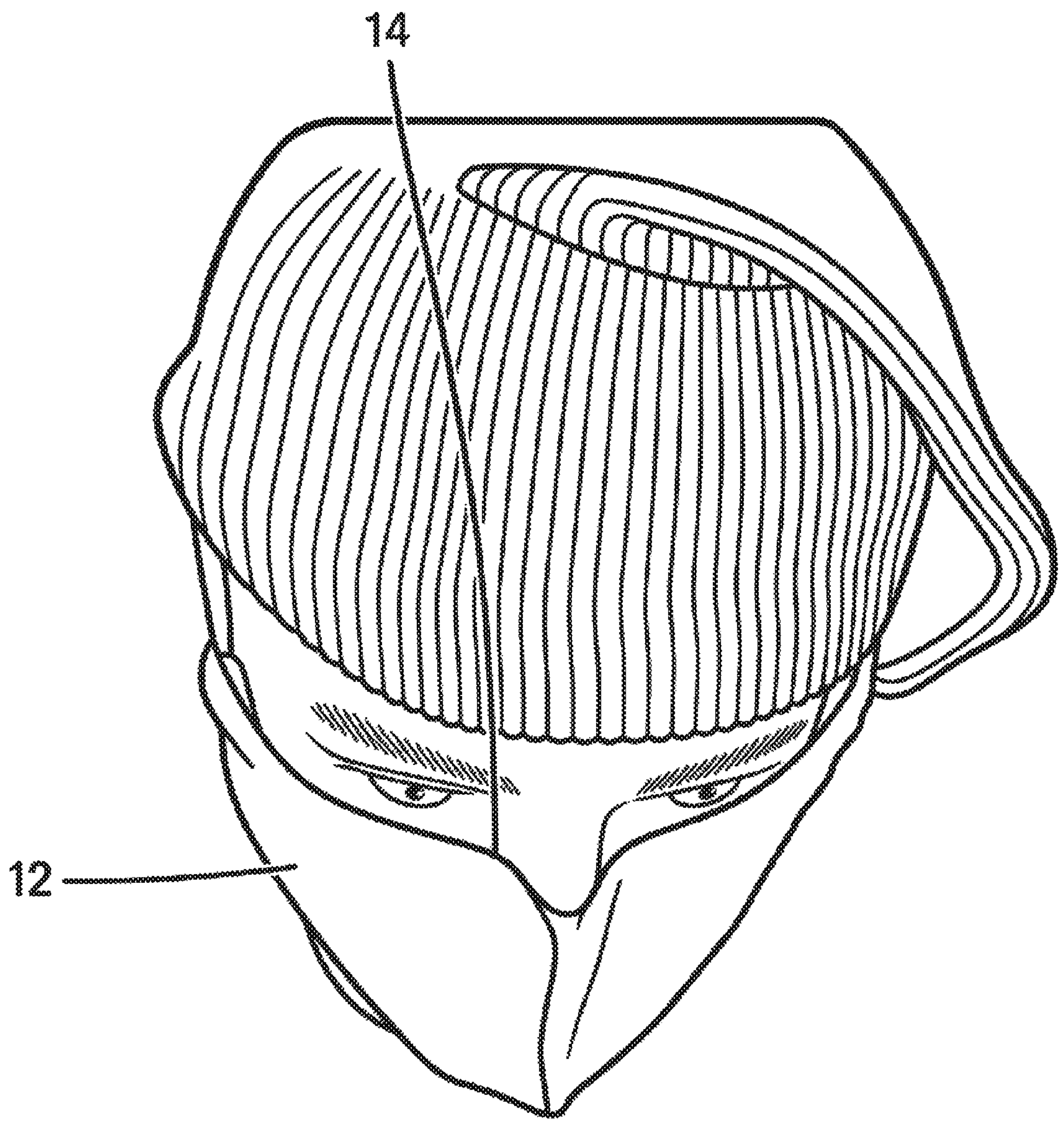
FIG. 3 shows a top-down view of a facemask according to one embodiment of the present disclosure.

Embodiments of face masks (or "facemasks") disclosed herein, such as a facemask 10 as shown in FIG. 1, may include a facemask portion 12 that is formed of fabrics and materials which can either be molded to retain a specific shape, or simply remain in a flexible and foldable state and worn upon the face of a person (or "user") to at a minimum cover the user's mouth and nose; and some facemasks can be designed without, or to, provide protection to the user from airborne or liquid-based hazards by the utilization of some filtration method of the air coming in through the mask which may be inhaled by the user or exhaled by the user pushing air out through the mask, and can include facemasks equipped with an exhale valve; and utilize different methods or configurations which allow the user to wear the facemask and have it fit their face in a way to maximize the intended benefits, capabilities, purposes, or uses of that facemask.

Embodiments of the facemask 10 described herein fit upon a user's face to substantially form a seal so air travelling into the facemask is inhaled and to exhaled such that air passes out of the facemask 10 through an intended filtration mechanism. Depending upon the seriousness of the hazard the requirement for the secureness of the seal may be different. Further, depending upon the size of particles to be filtered, the properties and specifications of the filtration mechanism may vary. Filtering sawdust is different than filtering asbestos, which is different than filtering bacteria or viruses. A goal of the facemask is to provide based upon not only the filtration properties of the facemask but the secureness of that fit to maximize those intended benefits.

The facemask portion 12 includes a pocket 13 located therein for receiving a filter element 15. The pocket 13 may be formed such that the pocket 13 is accessible from an inner side of the facemask portion 12. For example, a slot may be formed on the inner side of the facemask portion 12 such that the pocket 13 is located between an outer surface of the facemask portion and the inner side of the facemask portion 12.

Nose Bridge Device

Embodiments disclosed herein provide a unique, different, and innovative type of nose bridge device or nose bridge portion 14 which is made of different material, shape, and dimensions which together significantly improves the effectiveness over any other previous nose bridge device on a facemask, creating a more secure and comfortable fit.

The new nose bridge device 14 may be from about 10 cm to about 20 cm in length and may be approximately 18 cm in length and may be round having a diameter of from about 1.5 mm to 2 mm. The nose bridge portion 14 may be formed of a deformable metal wire, such as an aluminum/tin alloy. One example of a suitable material for the nose bridge portion 14 is armature. Armature is very flexible and can be articulated in almost any fashion. Yet armature has strength and is durable. Armature may be easily malleable so that when affixed to or embedded in a facemask, when the user puts the facemask on, placing it on their face, instead of simply pinching the device at the bridge of the user's nose, the user can instead use their fingers to conform the armature nose bridge device past the area of the nose and to the contours of the user's face.

The length of the armature nose bridge device may be approximately 18 cm, which may extend substantially across a width of an upper edge of the facemask portion 12, and which is over twice as long as the standard 8 cm length of other facemasks, creates a significant advantage as the extra length allows for fitting of the device to more area of the user's face which results in a more secure and comfortable fit than other facemasks currently available.

The armature nose bridge device is round rather than being flat. This allows the armature nose bridge device to fit to the contours of a user's face at any angle and is not dependent upon a flat or right-angle to maximize the benefits of the standard nose bridge device on other facemasks. This results in a more secure and comfortable fit than other facemasks currently available.

While the standard nose bridge device on other facemasks after a relatively short period of time does not maintain a close fit and tends to expand or loose contact with the user's skin, the strength of the armature nose bridge device allows that device to maintain its shape for longer periods of time and because of its length it can obtain and thus maintain contact with the user's skin for a much longer periods of time. The effect created is as if the armature nose bridge device is able to gently grab hold of that portion of the user's face and stay attached. This affect results in less movement of that device which adds to its ability to obtain and maintain a secure fit.

Other benefits are created by a facemask which is utilizing the armature nose bridge device. Because a more secure and comfortable fit than other facemasks currently available is obtained and maintained, little or no air is escaping from the facemask in that area and this in turn essentially eliminates all fogging of the user's eye or sunglasses. Also, if the armature nose bridge device keeps the facemask in place, then there is less tendency of the user to constantly touch or try to readjust the facemask which prevents cross-contamination from anything which might have accumulated on the facemask and which might be touched.

The nose bridge portion 14 may be located within a hem 16 of the facemask portion 12. The hem 16 may be located substantially across a width of an upper edge of the facemask portion 12 for securing the nose bridge portion 14 therein.

Elastic Ear Straps

Embodiments herein provide an effective type of elastic ear strap which significantly lessens the potential for an opening or gap at each side of the facemask and is more efficient and better maximizes the elastic properties of the straps.

Specifically, embodiments disclosed herein provide a different and innovative elastic ear strap which configures these elastic ear straps so that on each side a single strap is attached to itself forming a separate continuous loop and then embedded in a sleeve configured from the facemask's material at the side of the facemask in such a way that the ear strap will not vertically slip or move within the sleeve resulting in more force at the middle of the mask's side, which "gathers" that portion of the mask, significantly improving the results of any other previous elastic ear strap configuration on a facemask, creating a much more secure fit.

Figure 4:
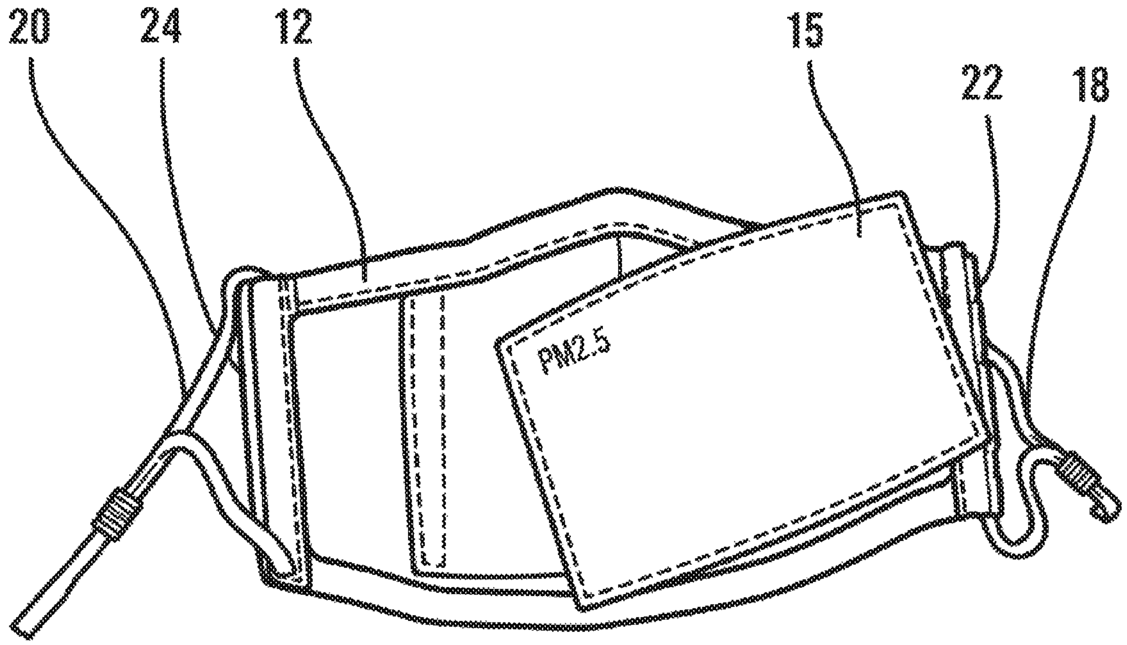
FIG. 4 shows a rear view of a facemask according to one embodiment of the present disclosure.

As shown in FIG. 4, a first ear strap 18 is located along a first side of the facemask portion 12 and a second ear strap 20 is located along a second side of the facemask portion 12. The first ear strap 18 may be secured on the facemask portion 12 through a first channel 22 located along the first side of the facemask portion 12. The second ear strap 20 may be secured on the facemask portion 12 through a second channel 24 located along the second side of the facemask portion 12. The first ear strap 18 may be slidable through the first channel 22 and the second ear strap 20 may be slidable through the second channel 24. The first channel 22 and the second channel 24 may be formed as hems along the side edges of the facemask portion 12. Further, the first channel 22 and the second channel 24 may be located over sides of the nose bridge portion 14 to secure the nose bridge portion 14 on the facemask portion 12.

Detection and Monitoring Technology

Embodiments of facemask 10 disclosed herein provide a new and innovative way to enhance the capabilities of the facemask by adding a new purpose and use by configuring the facemask's exterior to provide capabilities for detection and/or monitoring capabilities related to such areas as radiation and UVC light.

Figure 5:
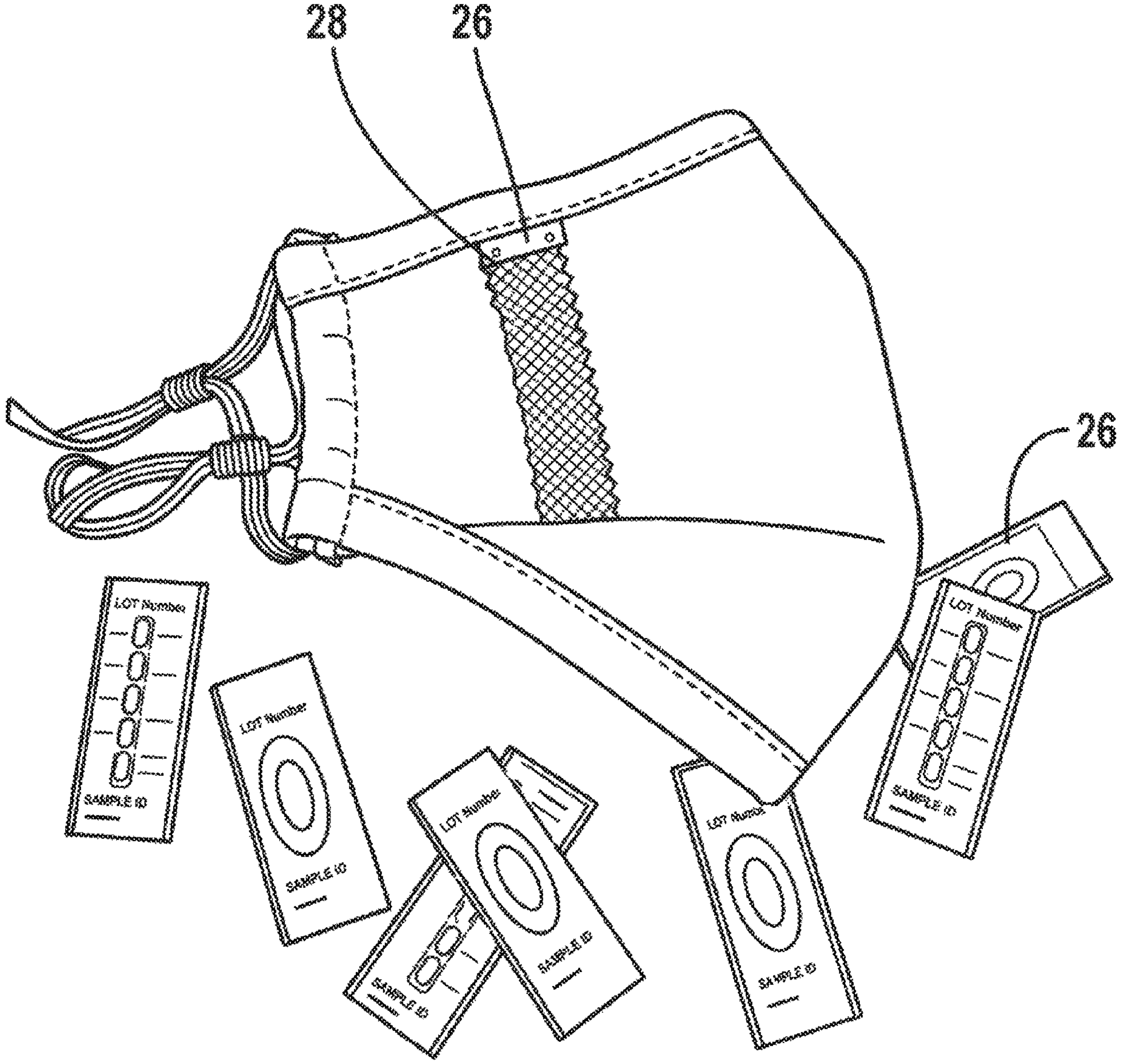
FIG. 5 shows a side view of a facemask that is folded according to one embodiment of the present disclosure.
Figure 6:
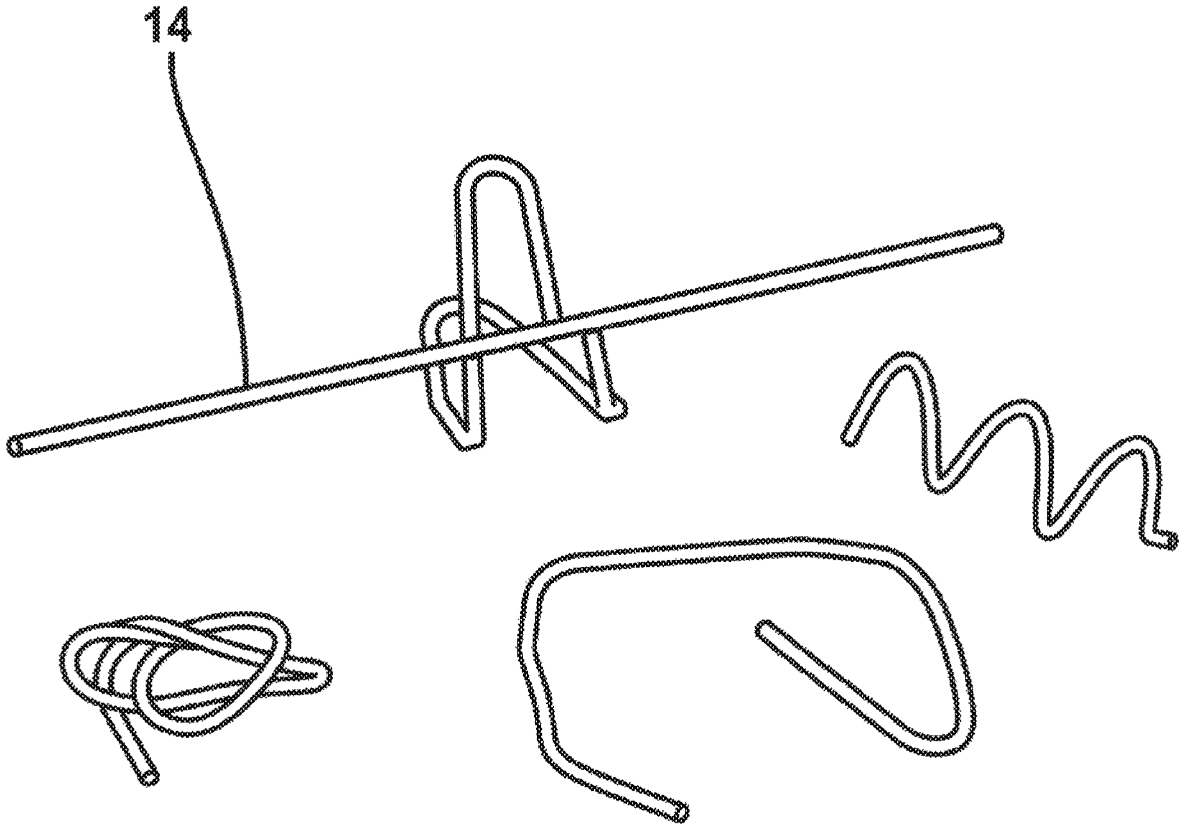
FIG. 6 shows an example of a nose bridge portion of a facemask according to one embodiment of the present disclosure.
Figure 7:
FIG. 7 shows a perspective view of a facemask retaining a shape according to one embodiment of the present disclosure.
Figure 8:
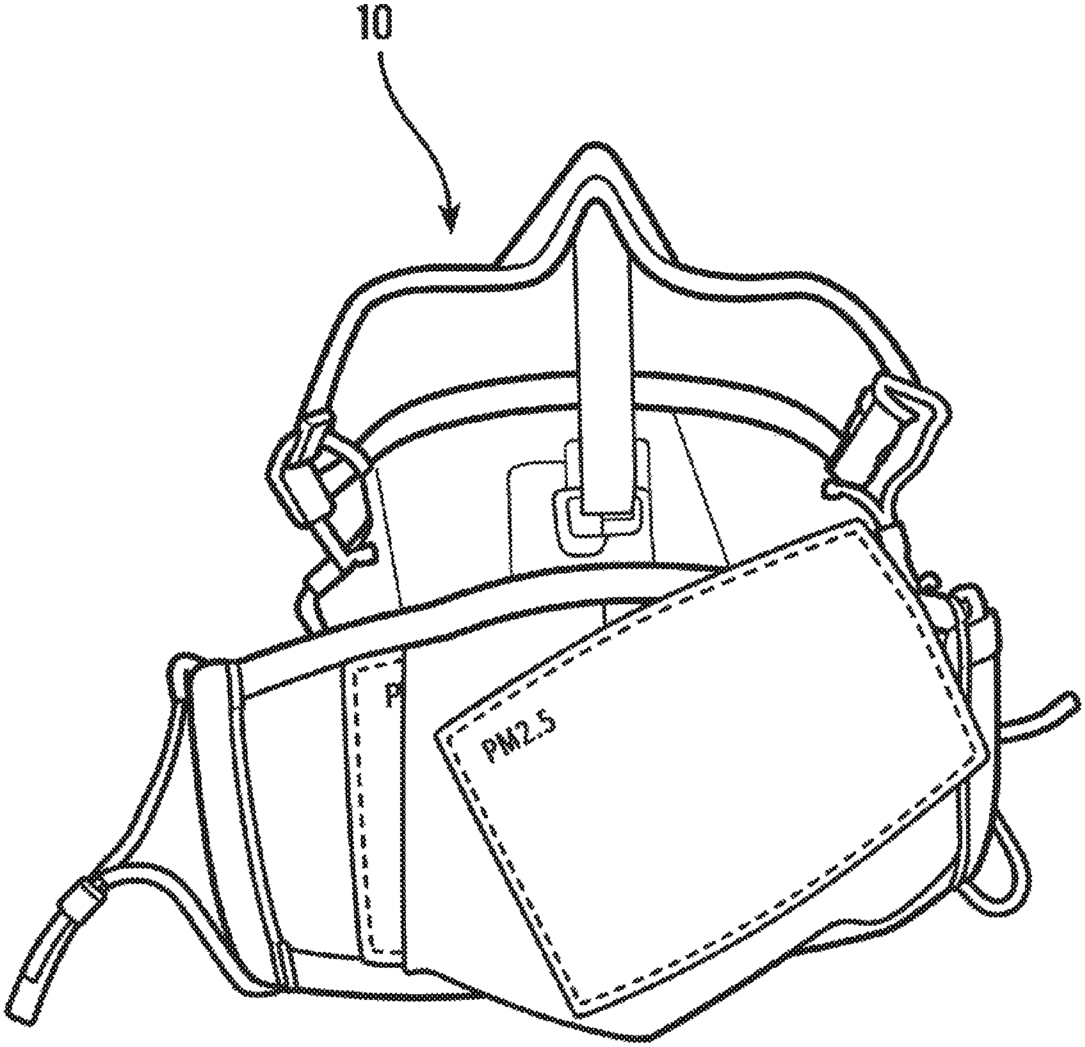
FIG. 8 shows a rear view of a facemask retaining a conformed shape according to one embodiment of the present disclosure.

Currently on the market are various detection and/or monitoring devices which take the form of essentially a two-dimensional card 26, as shown in FIG. 5. These devices can be of almost any imaginable size including sizes of 2 cm×5-6 cm. Examples of these devices are Radiation "Exposure Cards" or "Dosimeters" or UVC Light Exposure Cards or Dosimeters. It is a compliment of usage to consider that in situations where the need to utilize a facemask with a filtration device exists that circumstances of that situation would also cause a user to be concerned about exposure to substances such as radiation, biological, chemical, or UVC light. At present no facemask of any type is on the market which also accommodates any type of detection or monitoring technology.

Embodiments of this disclosure accommodate the configuration of the exterior of the facemask to utilize either a narrow pocket 28 to be placed into the facemask via slit in the outer material of the facemask with either additional material for that pocket or not to accommodate a detection and/or monitoring device of the appropriate size; or to have on the exterior of the facemask a method or capability to attach in some manner a detection and/or monitoring device of the appropriate size.

Of the methods or configurations utilized on existing facemasks to maximize the intended benefits of that facemask, a method or configuration on a facemask is provided which utilizes a nose bridge device made of armature and has the dimensions of 18 cm in length and round at 1.5 mm to 2 mm in diameter, as opposed to the standard nose bridge device of 8 cm in length 0.5 cm wide is flat and made of plastic and very thin wire, to provide a more secure and comfortable facemask fit that better holds the facemask to the user's face and eliminates eye or sunglass fog experienced from facemasks with the standard nose bridge device.

Of the methods or configurations utilized on existing facemasks to maximize the intended benefits of that facemask, a facemask is provided which utilizes an improved method and configuration of the way elastic straps are utilized on a facemask to hold the facemask to the user's face by having each elastic strap be a separate and closed loop which is embedded in separate sleeves on each side of a facemask that in turn uses tensions to the elastic straps when placed on the user's face to help provide a more secure and comfortable fit.

Embodiments herein provide a new and innovative way to enhance the capabilities of a facemask by adding a new purpose and use by configuring the exterior of the facemask to utilize either a narrow pocket to be placed into the facemask via slit in the outer material of the facemask with either additional material for that pocket or not to accommodate a detection and/or monitoring device of the approximate size of 2 cm wide by 5 cm to 6 cm long; or to have on the exterior of the facemask a method or capability to attach in some manner a detection and/or monitoring device of the same approximate size.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A facemask comprising:

a mask portion shaped to substantially cover a nose and mouth of a wearer of the facemask, the mask portion formed of a flexible material;

a nose bridge extending substantially across a width of an upper edge of the mask portion and including a stiff deformable portion located on the nose bridge, wherein the stiff deformable portion is deformable to contour to a shape configured to match a face of the wearer while substantially retaining the shape during use of the facemask, wherein the stiff deformable portion is formed of a round armature wire, wherein the armature wire comprises an alloy comprising aluminum and tin, the armature wire having a length of at least 18 cm and a round diameter of 1.5-2 mm;

a first ear loop located along a first side of the mask portion; and a second ear loop located along a second side of the mask portion.

2. The facemask of claim 1, the mask portion further comprising a hem located along the upper edge of the mask portion, wherein the armature wire is located within the hem.

3. The facemask of claim 1, wherein the first ear loop and the second ear loop are elastic.

4. The facemask of claim 1, the mask portion further comprising a first channel located along the first side of the mask portion and a second channel along the second side of the mask portion, wherein the first ear loop is located through the first channel along the first side of the mask portion and the second ear loop is located through the second channel along the second side of the mask portion.

5. The facemask of claim 4, wherein the first channel and the second channel are formed within side hems located along the first side and the second side of the mask portion.

6. The facemask of claim 4, wherein the first ear loop may slide within the first channel and wherein the second ear loop may slide within the second channel.

7. The facemask of claim 1, wherein the stiff deformable portion of the nose bridge retains the shaped contoured to the face of the wearer when the facemask is removed by the wearer.

8. The facemask of claim 1, further comprising a pocket located within the face mask portion shaped to receive a filter element therein.

9. The facemask of claim 1, further comprising a pocket located on an outer surface of the facemask portion and shaped to receive a detection or monitoring device therein.

10. A facemask comprising:

a mask portion shaped to substantially cover a nose and mouth of a wearer of the facemask, the mask portion formed of a flexible material;

a nose bridge extending substantially across a width of an upper edge of the mask portion and including a stiff deformable portion comprising armature wire located on the nose bridge, wherein the armature wire comprises an alloy comprising aluminum and tin, the armature wire having a length of at least 18 cm and a round diameter of 1.5-2 mm, wherein the armature wire is deformable to contour to a shape configured to match a face of the wearer while substantially retaining the shape during use of the facemask;

a first ear loop located along a first side of the mask portion; and a second ear loop located along a second side of the mask portion.

11. A facemask comprising:

a mask portion shaped to substantially cover a nose and mouth of a wearer of the facemask, the mask portion formed of a flexible material, wherein the mask portion includes a pocket located on an outer surface of the facemask portion that is shaped to receive a detection or monitoring device therein;

a nose bridge extending substantially across a width of an upper edge of the mask portion and including a stiff deformable portion located on the nose bridge, wherein the armature wire comprises an alloy comprising aluminum and tin, the armature wire having a length of at least 18 cm and a round diameter of 1.5-2 mm, wherein the stiff deformable portion is deformable to contour to a shape configured to match a face of the wearer while substantially retaining the shape during use of the facemask;

a first channel located along a first side of the mask portion;

a second channel located along a second side of the mask portion;

a first ear loop located through the first channel along the first side of the mask portion; and a second ear loop located through the second channel along the second side of the mask portion;

wherein the stiff deformable portion is secured on the nose bridge between the first channel along the first side of the mask portion and the second channel along the second side of the mask portion.

12. The facemask of claim 11, wherein the pocket is configured such that at least a portion of the detection or monitoring device is visible when viewing the outer surface of the facemask portion.

* * * * *